July 3, 1962  B. F. BROCKWAY  3,041,621
SAFETY HAT
Filed Aug. 3, 1959  2 Sheets-Sheet 2
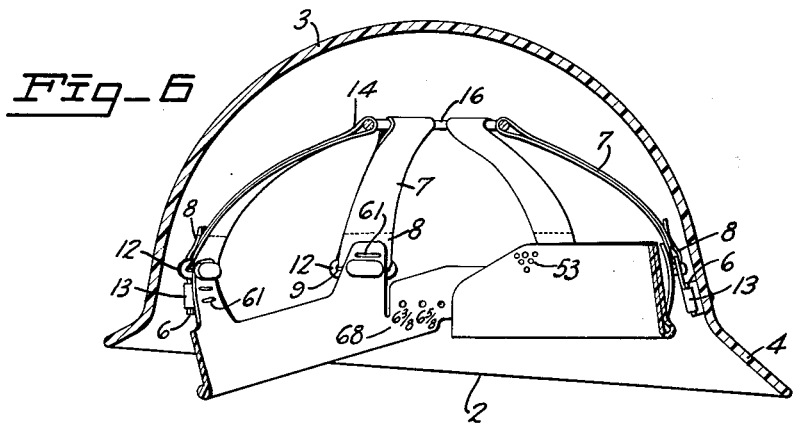
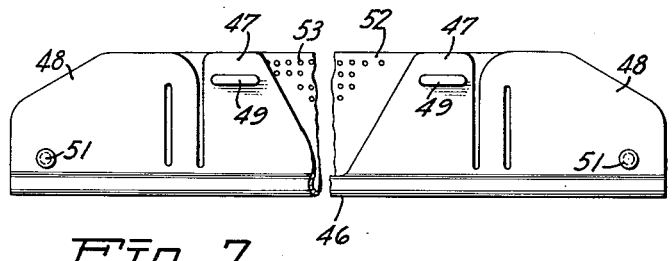
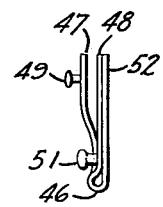
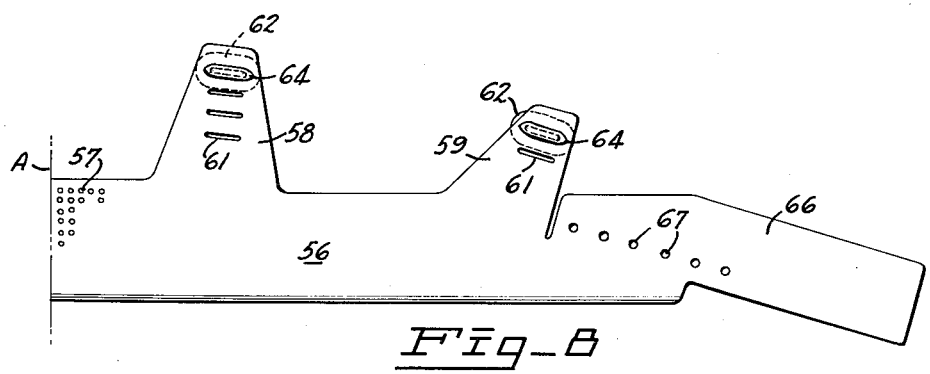
INVENTOR.
BROCK F. BROCKWAY
BY Charles S. Evans
his ATTORNEY

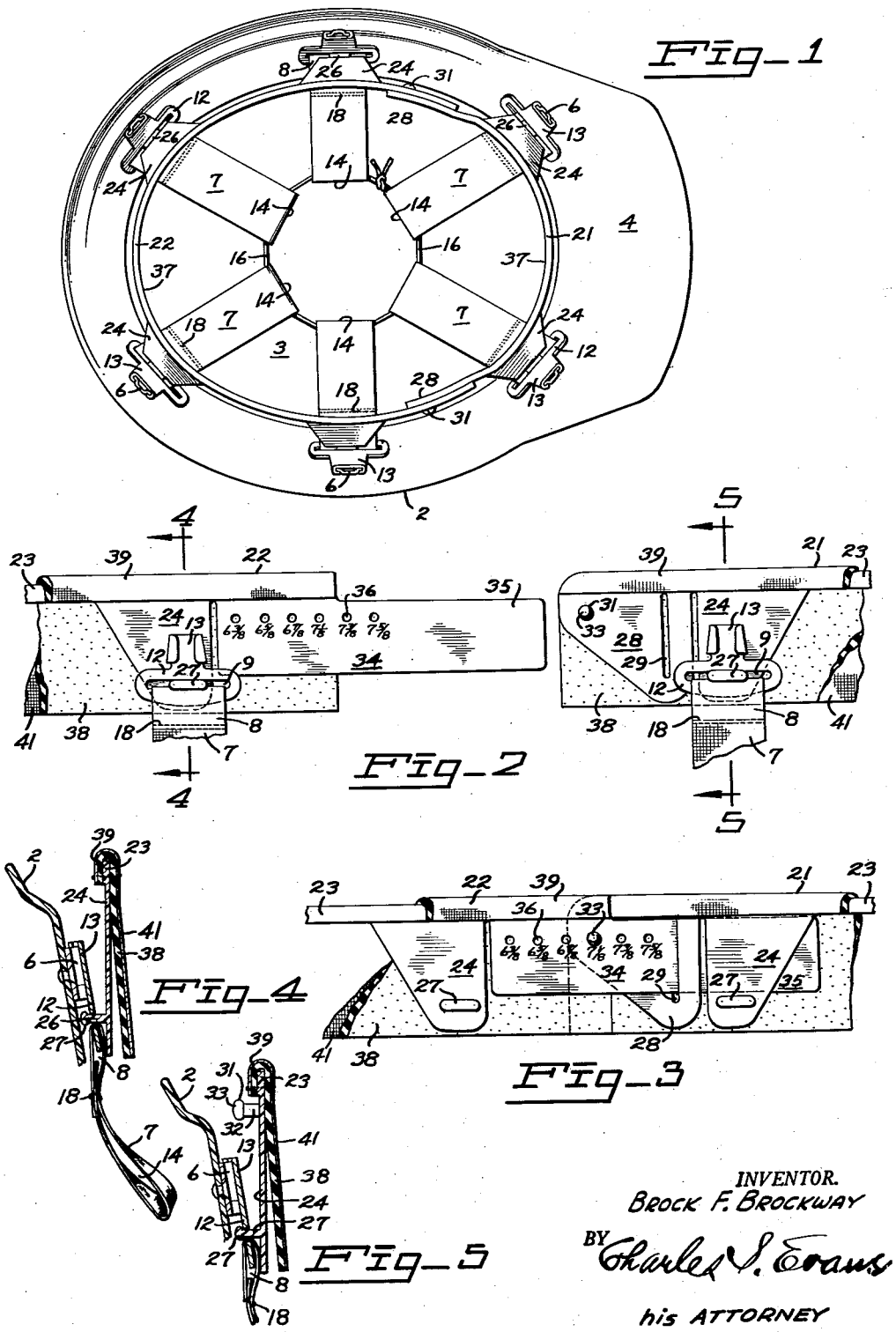

United States Patent Office 3,041,621
Patented July 3, 1962

3,041,621
SAFETY HAT
Brock F. Brockway, Mill Valley, Calif., assignor to E. D.
Bullard Company, Sausalito, Calif., a corporation of
California
Filed Aug. 3, 1959, Ser. No. 831,136
6 Claims. (Cl. 2—3)

My invention relates to safety hats, and particularly to a safety hat embodying improved suspension means.

One of the objects of the invention is the provision of a safety hat in which the suspension harness is detachably mounted.

Another object of the invention is the provision of a suspension harness capable of being immersed in a cleaning fluid without shrinkage or deterioration.

Another object of the invention is the provision of a suspension harness for safety hats incorporating a sweatband requiring a minimum of costly hand assembly.

Still another object of the invention is the provision of a sweatband in which major elements are prefabricated by production line techniques, and integral assembly of the separate elements into a completed sweatband is effected in one operation.

A further object of the invention is the provision of a suspension harness in which the sweatband is separately detachable from the headstraps whether or not the latter remain attached to the hat body.

Still another object is the provision of a two-part adjustable sweatband having complementary ends adjustably interconnected opposite the temples of the wearer.

Another object of the invention is the provision of a suspension harness which centers itself within the hat when adjusted to different head sizes.

A still further object of the invention is the provision of a suspension harness including a two-part adjustable sweatband having one part thereof canted in relation to the other part.

The invention possesses other objects and features of value some of which with the foregoing will be brought out in the following description of the invention. I do not limit myself to the showing made by the said description and the drawings, since I may adopt variant forms of the invention within the scope of the appended claims.

Referring to the drawings:

FIG. 1 is a plan view showing one embodiment of the suspension harness assembled in a safety hat.

FIG. 2 is a fragmentary elevation of a portion of the suspension harness shown in FIG. 1 removed from the hat and illustrating the adjustably interengageable ends of the sweatband before engagement.

FIG. 3 is a fragmentary elevation similar to FIG. 2, but illustrating the ends of the sweatband after engagement in adjusted position. For clarity the fastener elements and headstraps are omitted.

FIG. 4 is a vertical sectional view taken in the plane indicated by the line 4—4 in FIG. 2.

FIG. 5 is a vertical sectional view taken in the plane indicated by the line 5—5 in FIG. 2.

FIG. 6 is a vertical half-sectional view illustrating a modified embodiment of my invention.

FIG. 7 is an elevational view of the front sweatband section of the embodiment illustrated in FIG. 6 detached from the hat. A central portion of the sweatband is omitted to reduce the length of the view.

FIG. 8 is an elevational view illustrating one-half of the rear sweatband section of the modified embodiment of FIG. 6.

FIG. 9 is an end elevation of the front sweatband section, showing the relationship of mounting portion to head engaging portion.

FIG. 10 is a perspective view of one of the detachable studs utilized to detachably secure the rear sweatband section shown in FIG. 9 to the companion fastener elements.

FIGURES 1–3 and 6–10 are drawn to a scale approximately ½ actual size, and FIGS. 4 and 5 are drawn approximately actual size.

Broadly considered, the safety hat of my invention comprises a hat body having a crown possessing a rigidity commensurate with the purpose for which the hat is intended, and adapted to be supported on the head of the wearer by suitable suspension means detachably mounted within the hat body. Suitability of a suspension harness is determined by the facility with which the harness may be attached and detached, its reliability in use, whether or not it may be cleaned periodically without deteriorating, comfort to the wearer, and production at competitive prices. To achieve these qualities, my suspension harness comprises a cooperative combination of headstraps detachably connected to a sweatband by fasteners which also detachably support the harness within the hat by engagement with complementary fasteners fixed therein. The headstraps are conveniently formed from strip material woven from filaments of one of the synthetic resins, such as nylon, and are interconnected with the fasteners so that when installed in a safety hat the headstraps form a comfortable and extremely strong cradle adapted to overlie and be supported on the wearer's head. The sweatband detachably connected to the fastener elements comprises a mounting portion in direct engagement with the fasteners, and a head engaging portion integral with the mounting portion and formed from a material which may be comfortably worn in contact with the skin. Both mounting portion and head engaging portion are prefabricated and subsequently integrally united in the desired relationship. Means are provided for adjusting the size of the sweatband to fit the head of the wearer.

In terms of greater detail, the safety hat of my invention comprises a hat body 2 having a crown 3 integral therewith, and possessing a rigidity commensurate with the purpose for which the hat is intended. Thus, it may be desirable under some circumstances to provide a cap or hat in which the crown and body are molded from a relatively soft synthetic resinous material, or under different conditions fabricated from aluminum or some other suitable metal. In the drawings are illustrated a relatively rigid cap and hat molded from synthetic resinous material, and provided with an integral brim or bill 4 extending from the body. Fixed within the cap and hat adjacent their lower edges and at circumferentially spaced intervals, are a plurality of tapered lugs 6 constituting fastener elements within the body, to which may be detachably secured a suspension harness for supporting the hat body upon the head of a wearer.

The suspension harness is formed from a plurality of nylon headstraps 7, each provided with a loop 8 at one end engaging the closed eye 9 of fastener 12, which is also provided with a socket member 13 adapted to detachably engage the tapered lug 6 fixed in the hat. The lugs 6 and the complementary socket members 13 wedgingly engage in the direction which the hat would be driven by a downwardly directed blow. At its other end each headstrap is doubled back to provide a second loop 14, through which loops is strung a cord 16 for adjusting the relative positions of the inner looped ends 14 of the headstraps. Shortening the cord 16 will draw the looped ends together, causing the safety hat to sit higher on the wearer's head, while lengthening the cord 16 through the loop permits them to spread out, thus lowering the hat around the wearer's head. This construction is best shown in FIGS. 1 and 4, the latter illustrating how doubling the straps 7 back upon themselves at each end and stitching as at 18 forms both loops 8 and 14 in one operation from a single length of headstrap.

Detachably secured to the fasteners 12 and supported within the cap of FIG. 1 adjacent the lower edge thereof, is a sweatband comprising front and rear sections 21 and 22, respectively. Each sweatband section includes a flexible mounting portion comprising an elongated marginal strip 23 having relatively thinner transversely extending integral supporting tabs 24 extending therefrom at spaced intervals therealong. The front section 21 is provided with two such tabs of equal length, symmetrically shaped and equally spaced on opposite sides of the midpoint of the sweatband section. The rear section is provided with four such tabs of equal length also symmetrically shaped and spaced on opposite sides of the section's midpoint. Taken together, the flat supporting tabs on front and rear sweatband sections correspond in number to the fasteners 12 attached to the headstraps. To detachably connect the sweatband sections to the fasteners, a stud is provided integral at its base with a surface portion of each tab adjacent its free end, and having a rectangular shank 26 and an enlarged head 27 on its free end. The stud is formed from material permitting a small amount of deformability so that the head 27 may be pressed through the eye or slot 9 of the fastener 12. As shown in FIG. 2, the slot and stud are proportioned to permit circumferential sliding movement of the stud in the slot to permit adjustment of the sweatband to various head sizes.

Integral with each end portion of the marginal strip 23 of the front sweatband section is a sweatband anchor tab 28. The tabs, as shown best in FIGS. 2 and 3, are spaced from the adjacent support tabs 24, and each is provided with a transverse slot 29 adjacent its inner edge, and an integral anchor stud 31 spaced therefrom and adjacent the extreme end of the sweatband section. The studs 31 extend from the tabs 28 in the same direction and to about the same height as the studs 26—27, however the anchor studs are preferably formed with a cylindrical shank 32 and a semispherical head 33, as shown best in FIG. 5. The anchor tab 28 is adapted to interengage with an anchor and adjusting tab 34 integral with each end of the marginal strip 23 of the rear sweatband section 22. As shown best in FIGS. 2 and 3, the adjusting tabs 34 are conveniently rectangular and extend beyond the end of the marginal strip 23 in a tongue portion 35 having a width proportioned to permit insertion of the tongue through the transverse slot 29 in the associated anchor tab 28 on the end of the front sweatband section 21. In this relationship, the tongue extends behind the adjacent tab 24, and is positioned so that one of a series of apertures 36 is brought into registry with an associated anchor stud. Pressing the stud through the associated aperture serves to detachably connect the ends of front and rear sweatband sections to form a head encircling band.

Size adjustment of the mounting portion is effected by shifting the stud 31 along the series of apertures, each of which is provided with indicia correlated to a specific head size. For economy in manufacture, and to provide a stronger and more reliable product, the mounting portion, including the marginal strip, the support tabs and the anchor and adjusting tabs, are integrally molded as by an injection molding process requiring a minimum of individual hand processing of the sweatband.

Fixed to the marginal strips 23 of front and rear sweatband sections of the embodiment illustrated in FIG. 1 are head engaging portions 37. Each head engaging portion is preferably comprised of an elongated strip 38 of absorbent and/or cushioning material, such as polyurethane foam, vinyl foam, sponge rubber or other equivalent material. One long edge 39 of the head engaging strip portion is folded over the marginal strip 23 of the mounting portion and integrally bonded or joined thereto by any suitable means such as heat and pressure, stitching or an adhesive which provides a permanent union.

If desired, the resinous synthetic foam or sponge rubber may be left uncovered so as to directly contact the head of the wearer. This arrangement will provide maximum absorption of perspiration. In the event only the cushioning effect of the foam layer is desired, a facing sheet 41, shown best in FIGS. 4 and 5 and conveniently formed from leather or synthetic resin, may be attached to the mounting portion so that the foam layer lies interposed between the mounting portion and the facing sheet, which in this arrangement becomes the head engaging portion.

In the embodiment of the invention illustrated in FIGS. 6–10, the headstrap and detachable fastener assembly are identical to corresponding elements in the embodiment illustrated in FIGS. 1–5 and have been correspondingly numbered. The cooperative relationship between front and rear sweatband sections, and between the entire sweatband and the hat have been modified. In this embodiment the front sweatband section, as in the embodiment shown in FIG. 1, is provided with a mounting portion molded or stamped from synthetic resinous material and including a marginal strip 46 from which extend integral supporting tabs 47 and anchor tabs 48. A stud 49, integrally molded on each tab 47 adjacent its free end, serves to detachably connect the tab to an associated fastener element 12. Anchor studs 51 on the anchor tabs are provided to adjustably secure the front sweatband section to the cooperatively associated ends of the rear sweatband section.

Forming an integral part of the front sweatband section and constituting the head engaging portion of that section, is a flat strip 52 of material similar to the mounting portion. The strip is integral along one of its edges with marginal strip 46, and is folded back upon the mounting portion. The head engaging strip illustrated is provided with a series of apertures 53 which are preferably of a size to permit the passage of perspiration but small enough that they do not mark the wearer's forehead. The length of the front sweatband section is proportioned so that when lying flat against the forehead of the wearer, the ends lie opposite the wearer's temples, where they adjustably engage associated ends of the rear sweatband section.

The modified rear sweatband section illustrated in FIGS. 6 and 8 comprises a head engaging strip 56 of synthetic resinous material provided with apertures 57 for ventilation. Extending from one edge of the strip are a plurality of pairs of integral support tabs 58 and 59, each tab having a series of parallel elongated slots 61 therein as shown. Corresponding tabs of each pair are symmetrical on opposite sides of a median plane represented in FIG. 8 by line A. As illustrated, tabs 58 are longer than tabs 59 and are provided with a greater number of slots 61. A removable stud having a large flat head 62 on one end of a shank 63 adapted to be received in a slot 61, is provided at its other end with a smaller head 64 proportioned in size and consistency to permit its being crowded through a slot 61 and the slot 9 of an associated fastener element 12.

As shown in FIG. 6, when the stud 62—64 is inserted in the outermost slot 61 of each tab, and then engaged in the slot 9 of an associated fastener 12 detachably secured in the hat, the increased length of the inner pair of tabs 58 results in the rear sweatband section being canted with respect to the front sweatband section. It will thus be seen that when placed on the head of a wearer in position of use, the rear sweatband section engages the head in a zone below its greatest diameter, that is, between the base of the skull and the zone which would normally be engaged by a conventional sweatband. Engagement of the head in this zone tends to lock the headgear on the head; the wearer is able to bend over or stoop to pick up a dropped tool without fear that his headgear will fall from his head.

Integrally extending from each end portion of the rear sweatband section is an apertured adjustment tab or tongue 66. Each tongue extends from the strip 56 at an angle thereto, and is provided with a series of aligned apertures 67 adapted to be engaged by an anchor stud 51 on the front sweatband section. As shown in FIG. 6, in the canted position of the rear sweatband section, the tongues lie substantially parallel to the front sweatband section.

It will of course be apparent that as the tabs 58 and 59 are readjusted to engage the innermost slots 61 with the fasteners 12, that the rear sweatband section assumes a position approaching parallelism with the front sweatband section, while the adjustment tabs or tongues 66 compensate by pivoting on the studs 51. Size adjustment to accommodate different size heads is accomplished by shifting the anchor studs 51 into different apertures 67, which are conveniently correlated by appropriate indicia 68 embossed on the tab adjacent each aperture. Placement of the size adjustment in the temple region rather than at the back of the head as in conventional headgear is advantageous for several reasons. One reason is that most people have a natural hollow at this point which accommodates the double thickness of the overlapping front and rear sweatband sections. Another reason is that temple adjustment on opposite sides of the head causes the sweatband to be centered within the hat, thus rendering the headgear more comfortable to wear.

Other advantages flow from the versatility of being able to separately replace either front or rear sweatband section, or replace a non-absorbent front sweatband section such as shown in FIG. 7 with an absorbent one as disclosed in FIG. 2. Such versatility is not available in conventional headgear suspensions.

From the above it will be apparent that a safety hat suspension possessing the required reliability under stress and the other qualities necessary and desirable in a safety hat suspension, have been provided in the two embodiments of my invention described above. The construction permits ready detachability of the suspension from the safety hat body, adjustability of the sweatband and headstraps to accommodate different head sizes and shapes, and makes practical detachability of the suspension harness for cleaning or sterilizing.

I claim:

1. A safety hat and suspension harness therefor comprising a hat body, a plurality of fastener elements fixed within the hat body, a companion fastener element detachably engaging each fixed fastener element and having a slot therein, a plurality of headstraps each having a loop at both ends, one loop of each strap engaged in said slot of a companion fastener element, an adjusting cord engaging the other loops of the head straps, a flexible mounting band comprising a marginal strip with integral supporting tabs extending transversely therefrom, an integral stud fastener element on each supporting tab and engaging the slot in the companion fastener, and means for adjustably connecting opposite ends of the mounting band to provide a sweat band of desired head size.

2. A safety hat and suspension harness therefor comprising a hat body, a plurality of fastener elements fixed within the hat body, a companion fastener element detachably engaging each fixed fastener element and having a slot therein, a plurality of headstraps each having one end connected to a companion fastener element, an adjustable tie connection the other ends of the head straps, a flexible mounting band comprising a marginal strip with integral supporting and anchor tabs extending transversely therefrom, stud fastener means on each supporting tab for engaging the slot in the companion fastener, an anchor stud on the anchor tab adjacent one end of the mounting band and said anchor tab having a slot therein, and an elongated adjusting tab extending from the other end of the mounting band and engaged with the slot in the anchor tab and having a plurality of apertures therein selectively engageable with the anchor stud.

3. A safety hat and suspension harness therefor comprising a hat body, a plurality of fastener elements fixed within the hat body, a companion fastener element detachably engaging each fixed fastener element and having a slot therein, a plurality of head straps each having its ends secured to its intermediate portion to form connected loops, one loop of each head strap engaging said slot of a companion fastener element, an adjusting cord engaging the other loop of each head strap, a flexible mounting band rear section comprising a marginal strip having integral supporting tabs extending laterally therefrom and an apertured adjusting tab extending from each end thereof, a flexible mounting band front section shorter than the rear section and comprising a marginal strip with an integral supporting tab and a slotted anchor tab extending laterally adjacent each end thereof, stud fastener means on each supporting tab and engaging the slot in the companion fastener element, and stud fastener means on each anchor tab engaging a selected aperture in the adjacent adjusting tab when the adjusting tab lies in the slot of the anchor tab.

4. A safety hat and suspension harness therefor in accordance with claim 3 in which each adjusting tab is canted from the end of the marginal strip of the mounting band rear section.

5. A safety hat and suspension harness therefor comprising a hat body, a plurality of fastener elements fixed within the hat body, a companion fastener element detachably engaging each fixed fastener element and having a slot therein, a plurality of headstraps each having one end connected to a companion fastener element and its other end connected to a corresponding end of another headstrap, a flexible mounting band rear section comprising a marginal strip with integral slotted supporting tabs extending therefrom, the length of the tabs increasing from the ends of the section towards its center and the longer tabs having more slots than the shorter tabs, a flexible mounting band front section comprising a marginal strip having an integral supporting tab and a slotted anchor tab extending laterally from each end thereof, a headed anchor stud on each slotted anchor tab, fastener means on each supporting tab of the band front section for engagement in the slot of a companion fastener element, separate stud fastener means engaging the slot in a companion fastener and a selected slot in a supporting tab of the band rear section, and an elongated adjusting tab canted from each end of the mounting band rear section and engaging the slot in the adjacent anchor tab of the mounting band front section and having a plurality of apertures therein selectively engaged in the adjacent anchor stud.

6. A suspension harness for a safety hat having a plurality of fastener elements fixed within the hat body, comprising a plurality of head straps each being connected to a slotted fastener element constituting a companion fastener element to said fastener element in the hat, a flexible mounting band rear section comprising a marginal strip with integral slotted supporting tabs extending therefrom, the length of the tabs increasing from the ends of the section towards its center and the longer tabs having more slots than the shorter tabs, a flexible mounting band front section comprising a marginal strip having an integral supporting tab and a slotted anchor tab extending laterally from each end thereof, stud fastener means on each supporting tab of the band front section engaging the slot of the companion fastener element, separate stud fastener means engaging the slot in a companion fastener and a selected slot in a supporting tab of the band rear section, an elongated adjusting tab extending from each end of the mounting band rear section and engaging the slot in the adjacent anchor tab of the mounting band front section, and means selectively connecting each adjusting tab to the adjacent end of the mounting band front section.

References Cited in the file of this patent

UNITED STATES PATENTS

| 81,784 | Moses | Sept. 1, 1868 |
| 1,715,201 | Levin | May 28, 1929 |
| 1,997,017 | Roeloffzen | Apr. 9, 1935 |
| 2,384,183 | Ludwell | Sept. 4, 1945 |
| 2,536,467 | Ruggiero | Jan. 2, 1951 |
| 2,753,562 | McDonald | July 10, 1956 |
| 2,763,006 | Amundsen | Sept. 18, 1956 |
| 2,855,605 | Aileo | Oct. 14, 1958 |

FOREIGN PATENTS

| 790,809 | Great Britain | Feb. 19, 1958 |